(12) United States Patent
Redding et al.

(10) Patent No.: US 6,968,384 B1
(45) Date of Patent: Nov. 22, 2005

(54) LICENSE MANAGEMENT SYSTEM AND METHOD FOR COMMUTER LICENSING

(75) Inventors: Mark E. Redding, Newport Beach, CA (US); Logan A. Badia, Fullerton, CA (US); Sandeep Handa, New Delhi (IN); Hemant Sharma, Lake Forest, CA (US); Sanjay Chopra, New Delhi (IN); Rana Gupta, Haryana (IN); Poonam Lal, Haryana (IN)

(73) Assignee: Safenet, Inc., Belcamp, MD (US)

( * ) Notice: Subject to any disclaimer, the term of this patent is extended or adjusted under 35 U.S.C. 154(b) by 794 days.

(21) Appl. No.: 09/648,502

(22) Filed: Aug. 25, 2000

Related U.S. Application Data (60) Provisional application No. 60/152,785, filed on Sep. 7, 1999.

(51) Int. Cl.[7] .................. G06F 15/16; G06F 15/173; H04L 9/00
(52) U.S. Cl. .................. 709/229; 709/225; 713/201; 705/52; 705/59
(58) Field of Search .................. 709/201, 202, 709/203, 217, 226, 229; 713/153, 160, 170, 713/173, 185, 201; 705/52, 59

(56) References Cited

U.S. PATENT DOCUMENTS

| | | |
|---|---|---|
| 4,652,990 A | 3/1987 | Pailen et al. |
| 4,658,093 A | 4/1987 | Hellman |
| 4,685,055 A | 8/1987 | Thomas |
| 4,754,395 A | 6/1988 | Weisshaar et al. |
| 4,780,821 A | 10/1988 | Crossley |
| 4,791,565 A | 12/1988 | Dunham et al. |
| 4,796,220 A | 1/1989 | Wolfe |
| 5,117,222 A * | 5/1992 | McCurdy et al. ........ 340/573.4 |
| 5,138,712 A | 8/1992 | Corbin |
| 5,146,575 A | 9/1992 | Nolan, Jr. |
| 5,390,297 A | 2/1995 | Barber et al. |
| 5,745,879 A | 4/1998 | Wyman |
| 5,790,664 A * | 8/1998 | Coley et al. ............. 709/203 |
| 5,862,348 A | 1/1999 | Pedersen |

(Continued)

FOREIGN PATENT DOCUMENTS

GB 2316503 8/1996

OTHER PUBLICATIONS

PC Week, "Strength in Numbers", vol. V3, Jul 1986, p. 57.

(Continued)

*Primary Examiner*—Paul H. Kang
(74) *Attorney, Agent, or Firm*—Venable LLP (57) ABSTRACT

A system for managing licenses for protected software on a communication network is disclosed. The system includes at least one client computer that is capable of being coupled to or decoupled from the communication network. While coupled to the communication network, a user of the client computer may request a commuter authorization to use the protected software. At least one license server is also coupled to the communication network. Each license server is programmed for managing a distribution of allocations to use the protected software. In addition, at least one of the license servers is programmed for granting a commuter authorization in response to a request for a commuter authorization from a client computer if there is an available authorization. After a commuter authorization is received by a client computer, the client computer stores a commuter authorization lifetime representing a time period for which the commuter authorization is valid. The client computer may then use the protected software while coupled to or decoupled from the communication network until the commuter authorization lifetime expires.

17 Claims, 4 Drawing Sheets

U.S. PATENT DOCUMENTS

| | | | | |
|---|---|---|---|---|
| 5,970,143 | A | * | 10/1999 | Schneier et al. ............ 713/181 |
| 6,101,606 | A | * | 8/2000 | Diersch et al. ............. 713/201 |
| 2002/0161718 | A1 | * | 10/2002 | Coley et al. .................. 705/59 |

OTHER PUBLICATIONS

Digital Review, "Apollo Licenses Concurrent Users on Entire Network", vol. 4, No. 20, Oct. 26, 1987, p. 6.

IBM Technical Disclosure Bulletin, "Software Serial Number", vol. 26, No. 7B, Dec. 1983, pp. 3918-3919.

Chovan, J., "Handling Site-License Agreements and Public Domain Software Packages: What are the Issues?", ACM SIGUCCS Conference, Toledo, Ohio, Sep. 30-Oct. 4, 1985, pp. 175-179.

Brown, B., "Microcomputer Software Exchange at Michigan State University", ACM SIGUCCS Conference, Toledo, Ohio, Sep. 30-Oct. 4, 1985, pp. 185-197.

Halaris, A., Sloan, L., "Networked Microcomputers: New Challenges For Computing Center Management", SIGUCCS Newsletter, vol. 13, No. 4, Winter 1983, pp. 20-26.

Gerber, H., Pringle, G., "Instructional Computing and Local Area Networking", SIGUCCS Newsletter, vol. 17, No. 2, Summer 1987, pp. 8-13.

Kreutzer, A., "An On-Line System For Controlling and Monitoring Software Usage in a Microcomputer Laboratory", SIGUCCS Newsletter, vol. 18, No. 2, Summer 1988, pp. 29-32.

Allen, K., "Software Lending Library", ACM-SIGUCCS XII, Conference Proceedings, Nov., 1984, pp. 171-172.

InfoWorld, "FST Introduces a Copy Protection Scheme For Nets", vol. 7, No. 7, Nov. 25, 1985, p. 14.

Micro Communications, "Software Protection", vol. 2, No. 5, May, 1985, pp. 35-37.

PC World, "LAN Licensing Lags", vol. 3, No. 11, Nov. 1985, pp. 320, 324, 328.

Rifkin, A. et al, "RFS Structural Overview", USENIX Summer Conference Proceedings, Atlanta, Ga., Jun. 9-13, 1986, pp. 248-259.

Gould, E., "The Network File System Implemented on 4.3BSD", USENIX Conference, Atlanta, Ga., Jun. 9-13, 1986, pp. 294-298.

Software News, "The Promise of LANS: MIS Back in Control", pp. 51-54, 56-58.

IBM Technical Disclosure Bulletin, "Device/Profile Installation Procedure with Validation", vol. 28, No. 4, Sep. 1985, p. 1487.

The DEC Professional, "PACS Plus Relief for VAX/VMS Resource Management Headaches", Feb. 1986, pp. 58-62, 64.

Software News, "LAN Applications Prices Are Not Easy to Set", Apr. 1987, pp. 54, 56, 58.

SIGUCCS Newsletter, "Licensing of Microcomputer Software", vol. 15, No. 4, Winter 1985, pp. 9-12.

AMC-SIGUCCS User Services Conference IX, "A Software Management System", Atlanta, Ga., Oct. 11-14, 1981, pp. 9-17.

Brooks, C., "Experiences with Electronic Software Distribution", USENIX Summer Conference, Portland, Oregon, Jun. 11-14, 1985, pp. 433-436.

Leiss, E., "On Authorization Systems with Grantor-Controlled Propagation of Privileges", CompCon 83, San Francisco, CA, Feb. 28-Mar. 3, 1983, pp. 499-502.

Houy, T., "The Challenge of Selling Software on the Internet", Electronic Software Distribution: White Paper, http://www.elan.com/corp/esd.htm, Nov. 4, 1997, pp. 1-6.

IFOR/LS and EZ-LoK FAQ Product Information, http://www.gradient.com/support/techfaq/ifor/ezlok/ezprod.htm, Nov. 7, 1997, pp. 1-3.

Harper, Jr., R., "Software Licensing For Installations With Multiple Microcomputers", Abstract No.: C86000243, Computers & Education, 1985, vol. 9, No. 3, 1 page.

Cooper, F. et al., "Software Protection and Pricing in a LAN Environment", Abstract No. C86032120, Jurimetrics Journal, Winter 1986, vol. 26, No. 2, 1 page.

Rainbow Technologies, "Sentinel License Manager—Getting Started—for Windows TCP/IP and Novell NetWare—Release 5.0", 1997, pp. i-v, 1-24.

Rainbow Technologies, Notice for SentinelLM 5.0 UNIX Customers, 1997, 1 page.

Rainbow Technologies, "Sentinel License Manager—Integrator's Guide for NetWare—Release 5.0", 1997, pp. i-vi to IN-10.

Rainbow Technologies, "Sentinel License Manager—System Administrator'Guide for NetWare—Release 5.0", 1997, pp. i-1 to IN3.

Rainbow Technologies, "Sentinel License Manager—Reference Manual—Release 5.0", 1997, pp. i-1 to IN12.

Rainbow Technologies, "Sentinel License Manager—Integrator's Guide for UNIX—Release 5.0", 1997, pp. i-1 to IN10.

Rainbow Technologies, "Sentinel License Manager—System Administrator's Guide for INIX—5.0", 1997, pp. i-1 to IN4.

Rainbow Technologies, "Sentinel License Manager—Integrator's Guide for Windows TCP/IP—Release 5.0", 1997, pp. i-1 to IN12.

Rainbow Technologies, "Sentinel License Manager—System Administrator's Guide for Windows TCP/IP—Release 5.0", 1997, pp. i-1 to IN3.

Rainbow Technologies, "Sentinel License Manager—Integration Guide—Release 6.0", 1998, pp. i to 130.

Rainbow Technologies, "Sentinel License Manager—Programmer's Reference Manual—Release 6.0", 1998, pp. i to 187.

Rainbow Technologies, "Sentinel License Manager—System Administrator's Guide—Release 6.0", 1998, pp. i to 62.

Rainbow Technologies, "Notice for SentinelLM 6.0 UNIX Customers", Mar. 6, 1998, pp. 1, 2.

Rainbow Technologies, "SentinelLM License Management System, Release 6.1, Release Notes", Jan. 15, 1999, pp. 1-7.

Rainbow Technologies, "Sentinel Engineering Product Release Notes, SentinelLM License Management System", Version No. 6.1, Aug. 13, 1998, pp. 1-7.

Rainbow Technologies, "Notice for SentinelLM 6.1 UNIX Customers", Sep. 18, 1998, pp. 1, 2.

Rainbow Technologies, "SentinelLM License Manager, System Administrator's Guide, Releae 6.1", 1998, pp. i-61.

Rainbow Technologies, "SentinelLM License Manager, Developer's Integration Guide, Release 6.1", 1998, pp. i-164.

Rainbow Technologies, "SentinelLM License Manager, Evaluation Guide, Release 6.1", 1998, pp. i-23.

Rainbow Technologies, "SentinelLM License Manager, Programmer's Reference Manual, Release 6.1", 1998, pp. i-191.

Rainbow Technologies, "SentinelLM License Manager, SentinelLM Developer's Guide, Release 6.1", 1998, pp. i-127.

Rainbow Technologies, "Notice for SentinelLM UNIX Customers: Installing from CD", Feb. 26, 1999, pp. 1, 2.

Rainbow Technologies, SentinelLM License Management System, Release 6.2, Release Notes, Feb. 12, 1999, p. 1-11.

Rainbow Technologies, "Notice for SentinelLM 6.1 UNIX Tandem Customers", Feb. 16, 1999, pp. 1, 2.

Rainbow Technologies, "Notice for SentinelLM 6.1 UNIX Customers", Sep. 23, 1998, pp. 1, 2.

Elan Computer Group, "Comparing Elan License Manager with other software license managers", White Paper, Jun. 15, 1995, pp. 1-5.

Elan Computer Group, "Elan License Manager, Questions and Answers", Aug. 1995, G 0002556-0002562, pp. 1-6.

Elan Computer Group, "Elan License Manager, Technical Overview", Jul. 1995, G 0002546-0002555, pp. 1-9.

Elan Computer Group, "Elan License Manager, Integrator's Guide for Windows, Release 5.0", rev. Jan. 31, 1997, ELAN 002589-002597, pp. i-viii.

Elan Computer Group, "Elan License Manager, System Administrator's Guide for Windows, Release 5.0", rev. Jan. 31, 1997, ELAN 002598-002602, pp i-iv.

Elan Computer Group, "Elan License Manager, Reference Manual, Release 5.0", rev. Jan. 31, 1997, elan 002603-002609, pp. i-vi.

Common Licensing API, "License Service Application Programming Interface, API Specification v1.02", Jan. 28, 1993, RTI 3389-3413- pp. i-22.

Auto-Trol Technology Corp., "Auto-Trol Software Protection Installation Guide", Apr. 4, 1986, FF00016-00025, 10 pages.

Elan Computer Group, Elan License Manager Technical Overview, Nov. 13, 1997, ELAN 001702-001757, pp. 1-9; 1-2, i-iii, 1-44.

Highland Software, Inc., "FLEXlm End User/Programmers Manual", Mar. 8, 1991, BP 00022-BP 00037, pp. 1-3, 9-11, 19-21, A1-A3, 45, 61, 62, 84, 85.

Auto-Trol Technology Corp., "FLEXlm Programmers Guide, Dec. 1994", BP 00098-000137, pp. 1-36, 1-4.

Highland Software, Inc., "FLEXlm License Manager, Technical Overview", Oct., 1991, 8 pages.

Globetrotter Software, Inc., FLEXlm Programmers Guide for Windows, Version 5.11, Mar. 1997, RTI 5219-5290, pp. i-65.

Globetrotter Software, Inc., FLEXlm End User Manual, Version 6.0, Oct. 1997, RTI5129-5217, pp. 1-80.

Globetrotter Software, Inc., FLEXlm Refernce Manual, Version 6.0, Dec. 1997, RTI5291-5508, pp. i-206.

Globetrotter Software, Inc., FLEXlm Reference Manual, Version 6.1, Jan. 21, 1999, RTI5509-5942.

PCT International Search Report as issued in International Application No. PCT/US00/24359, Mailing Date Aug. 2, 2001.

* cited by examiner

LICENSE MANAGEMENT SYSTEM AND METHOD FOR COMMUTER LICENSING

CROSS-REFERENCE TO RELATED APPLICATIONS

Embodiments of the present invention claim priority from Provisional Application Ser. No. 60/152,785, filed Sep. 7, 1999, and are related to U.S. utility patent applications entitled "License Management System And Method With Multiple License Servers", Ser. No. 09/648,697, filed Aug. 25, 2000; "License Management System And Method With License Balancing", Ser. No. 09/648,720, filed Aug. 25, 2000; and "System And Method For Selecting A Server In A Multiple Server License Management System", Ser. No. 09/648,853, filed Aug. 25, 2000. The contents of each of these applications are incorporated by reference herein.

BACKGROUND OF THE INVENTION

1. Field of the Invention

The present invention relates, generally, to license management systems and processes for managing licenses on a computer network and, in preferred embodiments, to such systems and processes involving a pool of license servers for managing software licenses among one or more users on the network, and for granting authorizations to use protected software programs to client computers that may become temporarily disconnected from the network.

2. Description of Related Art

The increasing popularity of computer usage in homes and businesses, as well as in governmental, research and education institutions, has brought about a world-wide demand for greater software variety and sophistication. Indeed, the software development industry in most industrialized countries has shown substantial growth in recent years and is expected to show continued growth through the next decade.

However, as software sophistication increases, development costs associated with such software also tend to increase. Modern software programs can require months or even years of development, often involving expensive resources and teams of highly skilled engineers and programmers, before a product may be readied for sale or license. Thus, software development companies are often required to make large investments early in the development of their products, in the hope that the products will provide a volume of sales or license revenues sufficient to cover their development investments and generate profits.

Illegal software usage and piracy have become a significant problem to software development companies. Because of the nature of computer software, illegal usage and illegal copying of proprietary software programs can be difficult to detect or deter. The increasing usage of computer networks has added to the problem. Computer networks can allow multiple users to access and copy software stored by a common network program server or copy and pass software between each other, over the network. A legitimately purchased or licensed copy of a software program available on a network could result in many illegitimate usages or copies by unauthorized or unlicensed users having access to the network.

Various forms of encryption techniques have been developed to inhibit usage of encrypted software by unauthorized users that do not possess a decryption program or key. However, such techniques typically require each authorized users to obtain or be passed a decryption program or key, in advance of usage of the encrypted program. Accordingly, such techniques can be prohibitively inconvenient for some computer and network environments, where it is difficult or impractical to supply each authorized user with a decryption program or key or to decrypt a program for each user or usage.

Other software protection techniques have required legitimate or authorized users to have a special hardware device or circuit installed in or plugged into their computer, prior to usage of the protected software. See, e.g., U.S. Pat. No. 4,446,519 to Thomas. Again, such techniques can be prohibitively inconvenient for some computer and network environments. For example, if the network environment is such that the authorized user must use multiple computers on the network, then each computer must be provided with the special hardware device. Moreover, if the environment is such that computers having the special hardware device are not located in secure facilities, then unauthorized users may be able to access the protected software by using the non-secure computer in which the special hardware device is installed.

Accordingly, more sophisticated license management software has been developed for managing software licenses for computer networks, which do not require encryption of the protected software or special hardware devices in each authorized user's computer. For example, the assignee of the present invention, Rainbow Technologies, Inc., has marketed versions of a license management system under the trademark, SENTINELLM™. The SENTINELLM™ systems operate with a license server connected to a network of users. The license server stores and manages software licenses for the network users, in accordance with a license management program stored on the server. Each copy of a protected software program on the network is accompanied by a program code corresponding to a shell (also known as "wrapper") or library of Application Program Interface (API) functions, which communicates with the license management program on the server. When a user starts to run the protected software program, the shell code or library of API functions provided with the program communicates a request to use a license to the license server, over the network. The server, under the control of the license management software, responds to the request to determine whether it is storing an available license for the protected software program. If so, the server communicates an authorization message to the user and decrements a count of available licenses stored by the server. If not, the server communicates another message to the user, indicating that no licenses are available. In this manner, licenses are always stored and managed on a network license server. Each network user may have a copy of a protected software program, but must communicate with the license server for authorization to use the protected program.

License management systems which employ a license server, as discussed above, provide significant advantages with respect to the freedom to readily add, delete or change authorized users on the network, and the ability to readily control and alter licensing schemes (for example, to add or delete licenses or change conditions for licenses) by modifying only the license server files or programs. However, if all licenses are stored and managed in a single license server, failure of that server can result in a failure of the entire license management system. Accordingly, prior versions of the SENTINELLM™ systems include multiple license server capabilities, wherein two or more license servers are provided on the network, each having a pre-loaded license file and a license management program. One of the servers may be designated as a primary license server, while the others are designated as backup servers. If the primary server cannot be reached by a user, for example, because the primary server has crashed or otherwise gone down, the user may then communicate with a backup server to obtain an authorization message. The backup server, having a pre-loaded copy of the license file and the license management program, may then take over the license management functions.

Alternatively, in other prior versions of SENTINELLM™ systems, a shell program or library of API functions could be configured to send a general poll to all servers coupled to the communication channel on which the poll is sent. In response to a general poll, any server computer having a license file containing license information corresponding to the protected software program (whether or not the license information indicated that a license is available) would send a reply to the requesting client computer. The shell program or library of API functions associated with the requesting client computer would then respond to the first reply received from a license server having a license file storing license information for the protected software program. If the replying license server contains an available license for the protected software program, the replying license server provides an authorization message to the requesting client computer. If the replying license server does not contain an available license for the protected software program, the replying license server provides a message to the requesting client computer indicating that authorization to run the protected software program has not been granted. Such a system provides a degree of protection against system failure, in the event that one of the license servers crashes or goes down. The down server computer would not respond to the poll, but other server computers having appropriate license information in their license file would respond to the poll, thus, allowing the client computer to continue to seek authorization to run the protected software program, even though one of the servers was down.

While the above SENTINELLM™ systems have operated well in many contexts, each license server operates somewhat independent of other license servers. Accordingly, there is a need in the industry for improvements in connection with management and coordination of multiple license servers (or a pool of license servers) in software license management systems for computer networks.

SUMMARY OF THE DISCLOSURE

Therefore, it is an advantage of embodiments of the present invention to provide a license management system and method for more efficiently managing licenses on a network using a pool of multiple license servers.

It is a further advantage of embodiments of the present invention to provide a system and method for managing licenses on a network that allows a client computer to request and receive a commuter authorization from a license server while connected to the network, allowing the client computer to run a protected software program even if the client computer should become disconnected from the network.

It is a further advantage of embodiments of the present invention to provide a system and method for managing licenses on a network that allows a client computer to request and receive a commuter authorization from a license server while disconnected from the network, allowing the client computer to run a protected software program while disconnected from the network.

These and other advantages are accomplished according to a system for managing licenses for protected software on a communication network. The system includes at least one client computer that is capable of being coupled to or decoupled from the communication network. While coupled to the communication network, a user of the client computer may request a commuter authorization to use the protected software. At least one license server is also coupled to the communication network. Each license server is programmed for managing a distribution of allocations to use the protected software. In addition, at least one of the license servers is programmed for granting a commuter authorization in response to a request for a commuter authorization from a client computer if there is an available authorization. After a commuter authorization is received by a client computer, the client computer stores a commuter authorization lifetime representing a time period for which the commuter authorization is valid. The client computer may then use the protected software while coupled to or decoupled from the communication network until the commuter authorization lifetime expires.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Preferred embodiments of the invention relate to a system and process involving a pool of license servers for managing licenses to, for example, one or more protected software programs, files or other data structures, among one or more users on the network. Protected software may include, but is not limited to, for example, a software program, such as a word-processing program, a graphics program, a computer game, etc., a proprietary file or other data structure, such as a data-base or other form of data, as well as other software encoded information or instructions, for which the control of user access is desired. For purposes of simplifying the present disclosure, the protected software used in the following examples is one or more proprietary software programs.

According to a preferred embodiment of the present invention, the plurality of license servers are managed in accordance with a server pool scheme, as controlled by a license management program associated with each license server computer and the shell program or library of API functions associated with each copy of the protected software program. In preferred embodiments, the pool of license servers comprises three to 11 servers. However, it should be noted that alternative embodiments of the present invention are not limited to any particular maximum number of license servers. In addition, in further alternative embodiments, multiple pools of license servers can reside on a single network. In further alternative embodiments only a single license server is required for issuing commuter authorizations. However, for purposes of illustration only, embodiments of the present invention will be described herein with reference to a pool of three license servers.

Figure 1:
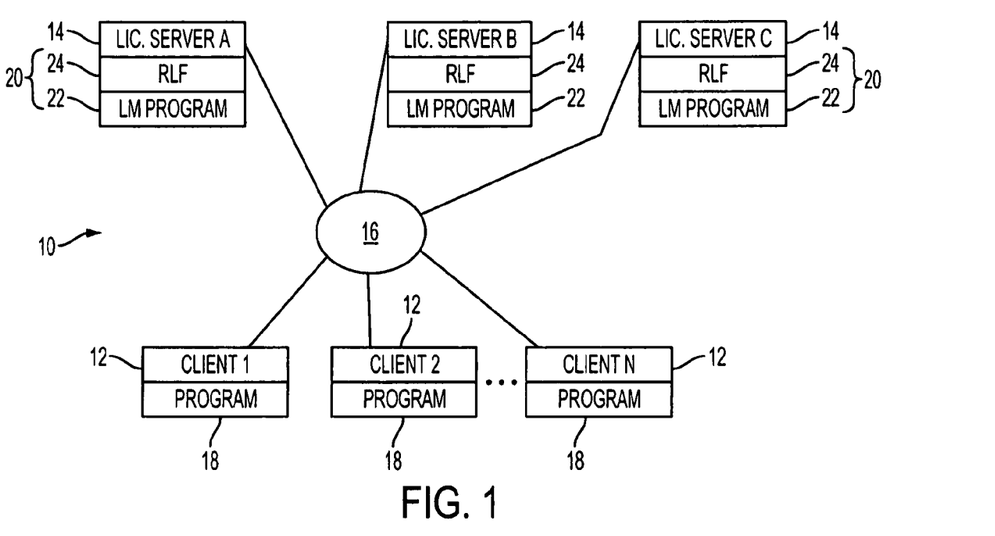
FIG. 1 is a generalized block diagram representation of an example network environment according to an embodiment of the present invention.

An example hardware environment for an embodiment of the present invention is illustrated, generally, in FIG. 1. With reference to FIG. 1, a computer network 10 includes a plurality of user or client computers 12 and three license servers 14, each coupled for communication over a communication network link, generally referenced at 16. The plurality of client computers 12 are identified as "Client 1", "Client 2", and "Client N", and the plurality of license servers 14 are labeled as "Lic. Server A", "Lic. Server B", and "Lic. Server C." Embodiments may employ any suitable number of client computers 12 and any suitable number of license servers 14. Also, while not shown in FIG. 1, the network 10 may include additional components, including one or more program or file servers, routers and/or other well known network devices and resources.

Each client computer 12 preferably includes a suitable processor and associated transient memory, such as a RAM, for running a protected software program. The client computer may be part of a standard personal computer (PC), network terminal, workstation or the like. In one preferred embodiment, each client computer 12 is coupled to a persistent program storage memory device 18, which may include, but is not limited to, a hard disc drive, floppy disc drive, tape drive, CD-ROM or the like, having a computer readable medium on which the protected software program is stored. Also stored as part of the protected software program is additional program code, such as code corresponding to a shell or library of API functions as discussed above, for communicating with the server computers which are under control of a license management program, in accordance with communication functions discussed below.

Each license server 14 preferably includes a suitable processor and associated transient memory, such as an RAM, for running a license management program as described herein. In addition, each license server 14 is coupled to one or more persistent program storage memory devices 20, which may include, but is not limited to, a hard disc drive, floppy disc drive, tape drive, CD-ROM or the like, having a computer readable medium on which a license management program 22 and a redundant license file (RLF) 24 are stored.

Figure 2:
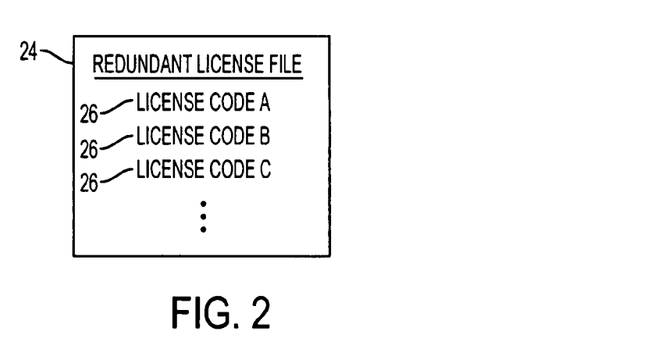
FIG. 2 is a generalized representation of a redundant license file (RLF) for the network environment of FIG. 1 according to an embodiment of the present invention.

An example embodiment of an RLF 24 is shown in FIG. 2 as containing license codes 26 for proprietary software programs A, B, C, etc. Each license code 26, in one example embodiment, comprises a string of data relating to license policy and the software program to which the license policy applies. In preferred embodiments, license codes 26 for software produced by more than one vendor may reside within the same RLF 24 of the same license server 14, and may be managed with a single process (execution of the license management software) running on a single license server 14. Thus, any given licenser server 14 does not need to have multiple license management processes running to manage licenses for multiple protected vendor applications. Instead, only one license management program needs to be running on a given license server 14, to manage licenses for protected vendor applications managed by that license server.

Figure 3:
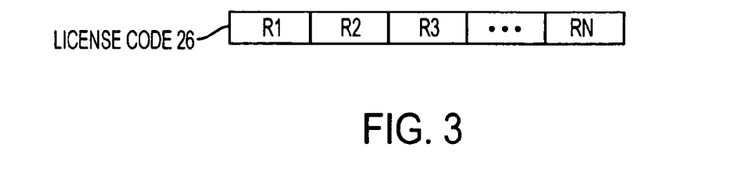
FIG. 3 is a generalized representation of a license code contained in an RLF of FIG. 2 according to an embodiment of the present invention.

In the example embodiment of FIG. 3, a license code 26 comprises a data string defining multiple records or fields R1, R2, R3 . . . RN, wherein each record corresponds to an attribute associated with the license policy, the software program to which the license policy applies, or other information. In preferred embodiments, each license code 26 includes at least one attribute associated with a license policy, the number of allocations for using the protected software program, and at least one other attribute associated with the identity of the protected software program. The number of allocations for using the protected software program is the maximum number of users that can be running the protected software program at any one time, and is also referred to as the ceiling or hard limit. In preferred embodiments, license code 26 also includes a flag which determines if commuter licensing functionality, described herein, is enabled or disabled for the corresponding protected software program. This flag allows the software developer to make commuter licensing available only to selected customers. Data associated with a license policy preferably includes data representing the expiration date or expiration time of the license, as granted by the licensee (e.g., the protected software program's owner or developer).

Figure 4:
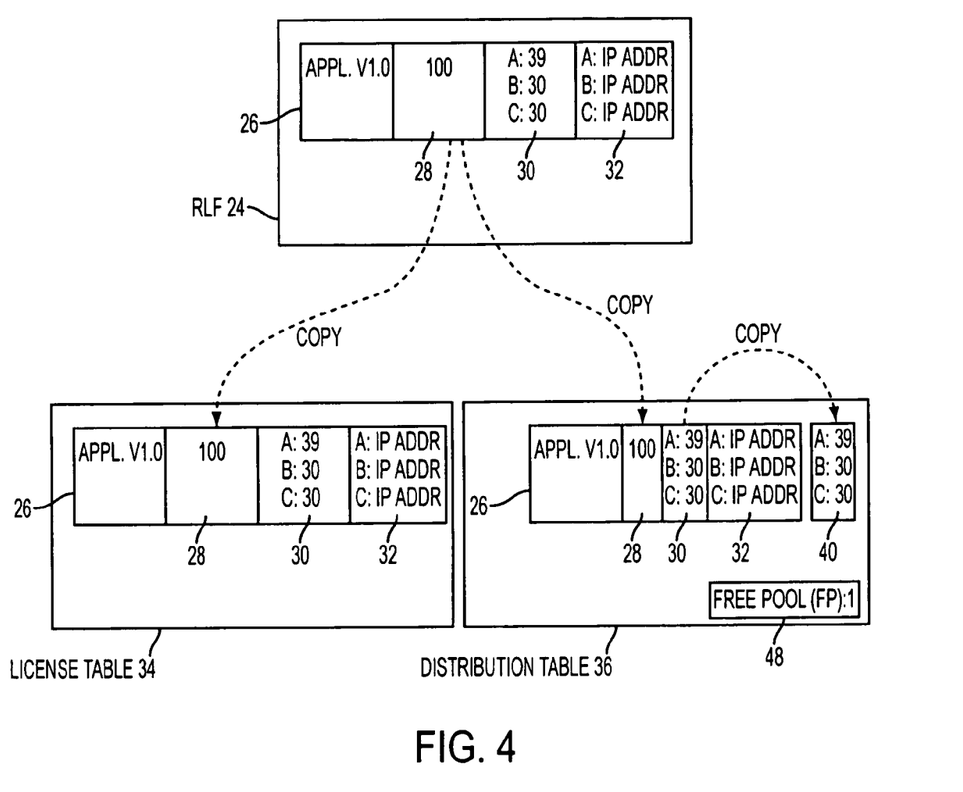
FIG. 4 is a generalized representation of a license code contained in an RLF and copied into a license table and a distribution table within a single license server for the network environment of FIG. 1 according to an embodiment of the present invention.

For purposes of illustration only, in the example of FIG. 4 only one fictional license code 26, identified as "Application v1.0," is stored in the RLF 24 of a license server 14, with a hard limit of 100 total allocations distributable across all license servers 14 (see reference character 28). In preferred embodiments, another attribute of the RLF 24 is the IP address 32 for each license server 26. Another attribute of the RLF 24 is the distribution of the 100 allocations across all the license servers 14. This distribution is identified as the initial distribution 30, and is configurable by the network administrator. In the example of FIG. 4, an initial distribution 30 of A:39, B:30, C:30, indicates that 39 allocations will initially be assigned to license server A, 30 allocations will initially be assigned to license server B, 30 allocations will initially be assigned to license server C, and one allocation will initially be assigned to the free pool 48. This initial distribution 30 also signifies that the pool will comprise three license servers.

In preferred embodiments of the present invention, each RLF 24 stored in each license server 14 is an exact copy of every other RLF 24 of license servers in the pool. Thus, attributes of the license code 26 such as the expiration date or number of allocations need not be passed between license servers 14 in response to a request for authorization to used a protected software program from a client computer 12, because an exact copy of the license code 26 has already been stored on the hard disk of each license server 14 prior to the startup of that license server 14.

Each license server 14 operates, under the control of its associated license management program 22, to perform license management functions in association with data contained in the RLF 24, as described herein. Thus, when a particular license server 14 is started, the license server 14 loads the contents of its RLF 24 into a license table 34 in RAM or other memory and reads the license table 34, which identifies that server as a license server 14. It should be noted that in preferred embodiments, the license table 34 is never modified. In addition, the contents of the RLF 24 is loaded into a distribution table 36 in RAM or other memory, and the initial distribution 30 is further copied into another record, distinct from the license code 26, identified as a current distribution 40. Unlike the license table 34, the distribution table 36 changes its current distribution 40 over time, to keep track of current allocations.

It should be noted that in the example of FIG. 4, only 99 of the 100 allocations have been initially assigned by the network administrator. If the network administrator makes an initial distribution that does not equal the hard limit of allocations (see reference character 28), in preferred embodiments of the present invention the extra allocations will be put into a free pool 48 maintained within the distribution table 36. Thus, in the example of FIG. 4, one allocation is put into free pool 48. If, on the other hand, the network administrator makes no initial distribution 30 of allocations in the RLF 24, preferred embodiments will divide the allocations evenly over the number of servers in the pool, and any extras will be put in the free pool 48. For example (but not illustrated in FIG. 4), if no initial distribution 30 was assigned by the network administrator, information representing an even distribution of A:33, B:33, and C:33 would be stored in the initial distribution attribute 30 of the RLF 24, and when a particular license server 14 is started, the RLF 24 would load an even distribution of A:33, B:33, and C:33 into the current distribution attribute 40 of distribution table 36, and would load a value of one into the free pool 48.

In preferred embodiments of the present invention, when the license servers 14 in the server pool are started up, one of the license servers is designated as a leader server. Selection of a leader server is described in a related U.S. utility application entitled "System and Method for Selecting a Server in a Multiple Server License Management System," Ser. No. 09/648,853, filed Aug. 25, 2000, the contents of which are incorporated by reference herein. Other license servers 14 are designated as follower servers. The leader server always maintains a global picture of the current distribution of allocations within every license server 14 the server pool.

Figure 5:
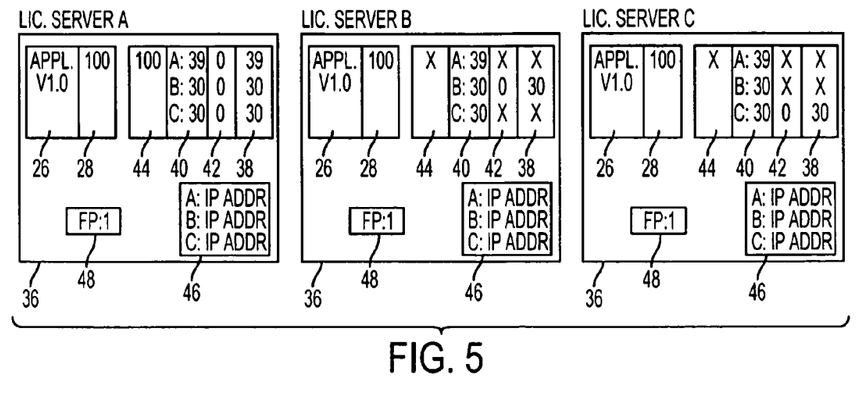
FIG. 5 is a generalized representation of an initial state of distribution tables of leader server A and follower servers B and C in a server pool comprising three license servers according to an embodiment of the present invention.

For purposes of illustration only, FIG. 5 illustrates an example of the distribution tables 36 for a three server pool consisting of license servers A, B, and C. Assume, for this illustration, that all three license servers have been started up, and that license server A has been designated as the leader server, and B and C as the follower servers. Further assume that the hard limit of allocations for the software program Application v1.0 is 100, as indicated by the hard limit record 28 associated with the license code 26 for Application v1.0 within each distribution table 36. In addition, assume that the current distribution of allocations is 39 on leader server A, 30 on follower server B, 30 on follower server C, and one in the free pool, as indicated in the current distribution record 40 and the free pool 48 associated with the license code 26 for Application v1.0 within each distribution table 36.

Note also that in the embodiment of FIG. 5, associated with each license code 26 is a record for available allocations for each server in the pool (see reference character 38), a record for available allocations for all servers in the pool (see reference character 44), and a record for allocations currently in use for each server in the pool (see reference character 42). The allocations in these records are values which are incremented or decremented as authorizations are issued, returned, or borrowed. It should be understood that the records identified by reference characters 28, 38, 40, 42, and 44 in FIG. 5 are associated with a particular license code 26, but are distinct from it.

As indicated in FIG. 5, in preferred embodiments of the present invention, the structure of the distribution tables 36 will be the same for both the leader server A and follower servers B and C, but only the distribution table 36 for leader server A (the leader distribution table) will reflect the allocation status of the other license servers 14 in the server pool. In contrast, the distribution tables 36 for follower servers B and C (the follower distribution tables) will only reflect the allocation status of that particular follower server, as indicated by the X (don't care) designations in portions of the follower distribution tables.

When a user at a client computer 12 desires to run Application v1.0 from a follower server, such as follower server B, for example, the client computer 12 may first load some or all of the protected program into the transient memory of the client computer 12, along with the program code corresponding to a shell or library of API functions. Alternatively, the protected program may remain in persistent memory 18 until and unless the server computer communicates an authorization signal to the shell program or library of API functions. Selection of a follower server from which to request authorization is described in a related U.S. utility application entitled "System and Method for Selecting a Server in a Multiple Server License Management System," Ser. No. 09/648,853, filed Aug. 25, 2000, the contents of which are incorporated by reference herein. Alternatively, the protected program may remain in persistent memory 18 until and unless the server computer communicates an authorization signal to the shell program or library of API functions. Loading of the shell program or library of API functions is preferably transparent to the user on the client computer 12 and, preferably, occurs in response to the user inputting a command to open the protected software (for example, by clicking a mouse button on an icon associated with the protected software).

Figure 6:
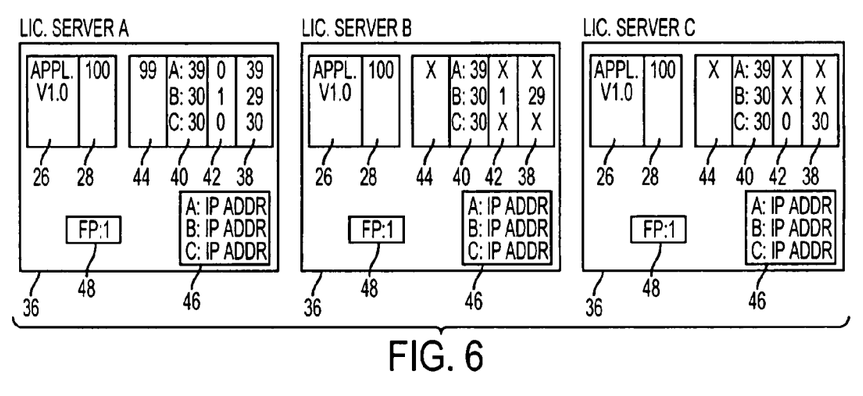
FIG. 6 is a generalized representation of distribution tables of leader server A and follower servers B and C in a server pool comprising three license servers in the example of FIG. 5 after an authorization has been granted by follower server B according to an embodiment of the present invention.

As part of the function of the shell or library of API functions, a request is then sent from the client computer 12 to follower server B for one or more authorizations to run the protected program. For purposes of this example, assume that client computer 12 requested only one authorization. Follower server B, under the control of the license management software, responds to the request by looking at its distribution table 36 to determine whether it has available allocations for Application v1.0. In the example of FIG. 5, follower server B has 30 allocations available, as represented by the available allocations record for each server in the pool (reference character 38) in the distribution table 36 for follower server B. Because it has available allocations, follower server B communicates an authorization message to the client computer 12. As illustrated in FIG. 6, once the authorization message is sent, the distribution table 36 is updated so that the available allocations record 38 for follower server B decreases to 29, and the allocations in use record 42 for follower server B increases to one. If an insufficient number of allocations are available to completely satisfy the request, no authorizations are sent, and follower server B communicates another message back to the client computer 12, denying the request. In preferred embodiments, follower server B will then issue a borrow request in an attempt to borrow available allocations from another source. Borrowing is described in a related U.S. utility application entitled "License Management System and Method with License Balancing," Ser. No. 09/648,720, filed Aug. 25, 2000, the contents of which are incorporated by reference herein.

As noted above, in preferred embodiments of the present invention the leader server always has a global picture of the distribution of allocations in the whole server pool. Thus, in the present example any changes to the distribution table of follower server B must be communicated to leader server A. In preferred embodiments, follower server B can determine the IP address for the leader server A from a leader priority list 46, which is configurable by the network administrator. It should be noted that in preferred embodiments, the IP address of all license servers 14 in the server pool are stored in the leader priority list 46, a data structure separate from the license codes 26, to facilitate faster lookup. However, in alternative embodiments the IP addresses may be stored in a record associated with the license codes 26. In any case, after determining the IP address of the leader server A, follower server B communicates the fact that its available allocations count has dropped to 29 to leader server A, and the distribution table of leader server A will be updated accordingly. Thus, as illustrated in FIG. 6, the distribution table 36 of leader server A reflects that the available allocations record 38 for follower server B has dropped to 29, the allocations in use record 42 for follower server B has increased to 1, and that the record for allocations available for all servers in the pool (see reference character 44) has dropped to 99.

The preceding discussion described a client computer 12 requesting and receiving authorization for running a protected software program from a networked license server 14. In the operating environment described above, the client computer 12 must remain connected to the network to continue to run the protected software program. For purposes of distinguishing the above-described system from embodiments of the present invention, the authorizations described in the preceding discussion will be referred to hereinafter as "network" authorizations.

Commuter licensing will be described next according to embodiments of the present invention. Commuter licensing departs from the concept of requesting and granting a network authorization between license server 14 and client computer 12, and instead is concerned with requesting and granting a "commuter" authorization between license server 14 and client computer 12. While a network authorization is managed by the issuing license server 14 and the server pool, commuter authorizations, once granted to a particular client computer 12, are managed both by the client computer 12 and also by the issuing license server 14. It should be noted, however, that although embodiments of the present invention described herein include a pool or license servers 14, in alternative embodiments only a single license server 14 is required for issuing commuter authorizations.

One practical application of commuter licensing according to embodiments of the present invention is for networks employing laptop or notebook client computers 12 that can readily be disconnected from the network. For example, prior to leaving for a business trip or working at home, a user can request a commuter authorization for one or more protected applications from a client computer 12 connected to the network. Once a commuter authorization is granted, the client computer 12 can be disconnected from the network, and can independently instantiate the protected application one or more times using the commuter authorization. This is in contrast to network authorizations, where a client computer 12 must request and receive a network authorization for each instantiation of the protected application.

As described earlier and illustrated in FIG. 8, a developer of a software program 50 to be protected must link the software program to a corresponding shell program code or library of API functions, referred to hereinafter as a client library 52. The linked software program 50 and client library 52 are then loaded onto a client computer 12. In preferred embodiments of the present invention, a user can request a commuter authorization for a particular protected software program 50 by running a separate utility 54 on a client computer 12 networked to the server pool. In preferred embodiments, this utility 54 enables the user to specify the license server 14 from which the commuter authorization will be requested, and the requested time duration of the commuter authorization. The utility 54 invokes the client library 52 associated with the requested software program 50, which first makes a local check to determine if the client library 52 has already received a commuter authorization. If it has, the utility 54 terminates. If it has not, then the client library 52 sends a request for a commuter authorization to the specified license server 14 in the server pool. The request includes a "fingerprint," information that uniquely identifies the client computer 12 from which the request is made.

In alternative embodiments of the present invention, a user can also request a commuter authorization for a particular protected software program 50 by attempting to open the protected software program 50. In preferred embodiments, the client library 52 associated with the requested software program 50 first makes a local check to determine if the client library 52 has already received a commuter authorization. If it has, the protected software program 50 is opened, as will be described in greater detail below. If it has not, then the client library 52 sends a request for a commuter authorization to the specified license server 14 in the server pool, and once a commuter authorization is received, the protected software program 50 is opened. In alternative embodiments, the client library 52 does not make a local check, but immediately sends a request for a commuter authorization to the specified license server 14 in the server pool.

In preferred embodiments of the present invention, commuter authorizations and network authorizations can be simultaneously received and managed. Thus, a commuter authorization can be requested and received by a client computer 12 even though the client computer 12 may already have a network authorization for the same protected software program 50.

When a license server 14 receives a request for a commuter authorization, the license server 14, under the control of the license management software 22, responds to the request by looking at its distribution table 36 to determine whether it has an available allocation for Application v1.0.

Figure 7:
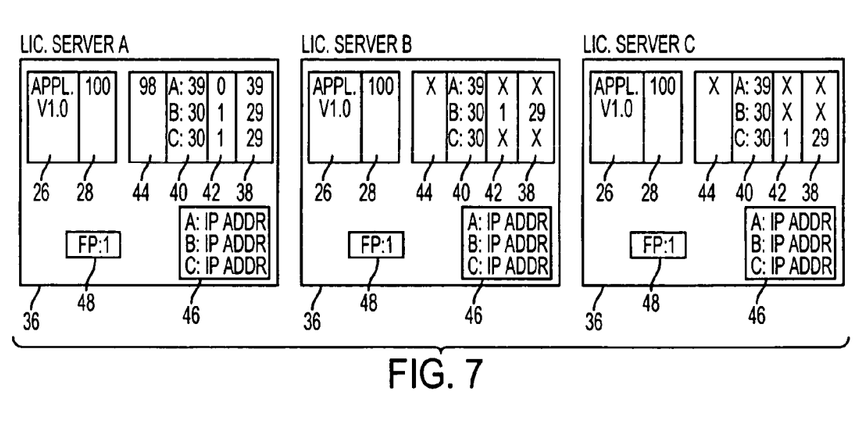
FIG. 7 is a generalized representation of the distribution tables of leader server A and follower servers B and C in a server pool comprising three license servers in the example of FIG. 6 after a commuter authorization has been granted by follower server C according to an embodiment of the present invention.

Continuing the example of FIG. 6 for purposes of illustration only, assume that a request for a commuter authorization has been made to follower server C. In the example of FIG. 6, follower server C has 30 allocations available, as represented by the available allocations record for each server in the pool (reference character 38) in the distribution table 36 for follower server C. Because it has an available allocation, follower server C sends a commuter authorization message to the client computer 12. As illustrated in FIG. 7, once the commuter authorization message is sent, the distribution table 36 is updated so that the available allocations record 38 for follower server C decreases to 29, and the allocations in use record 42 for follower server C increases to one. In so doing, one of the available allocations for a network authorization has been effectively transformed into a commuter authorization.

It should be noted that in preferred embodiments of the present invention, follower server C may receive multiple requests for commuter authorizations from client computers 12, and may grant as many commuter authorizations as there are available allocations. However, if an insufficient number of allocations are available, in preferred embodiments follower server C may then issue a borrow request in an attempt to borrow an available allocation from another license server 14. In alternative embodiments, the network administrator or software developer may limit the number of commuter authorizations that may be issued as a percentage of the hard limit of allocations stored in the hard limit record 28 for a particular protected software program 50.

Figure 8:
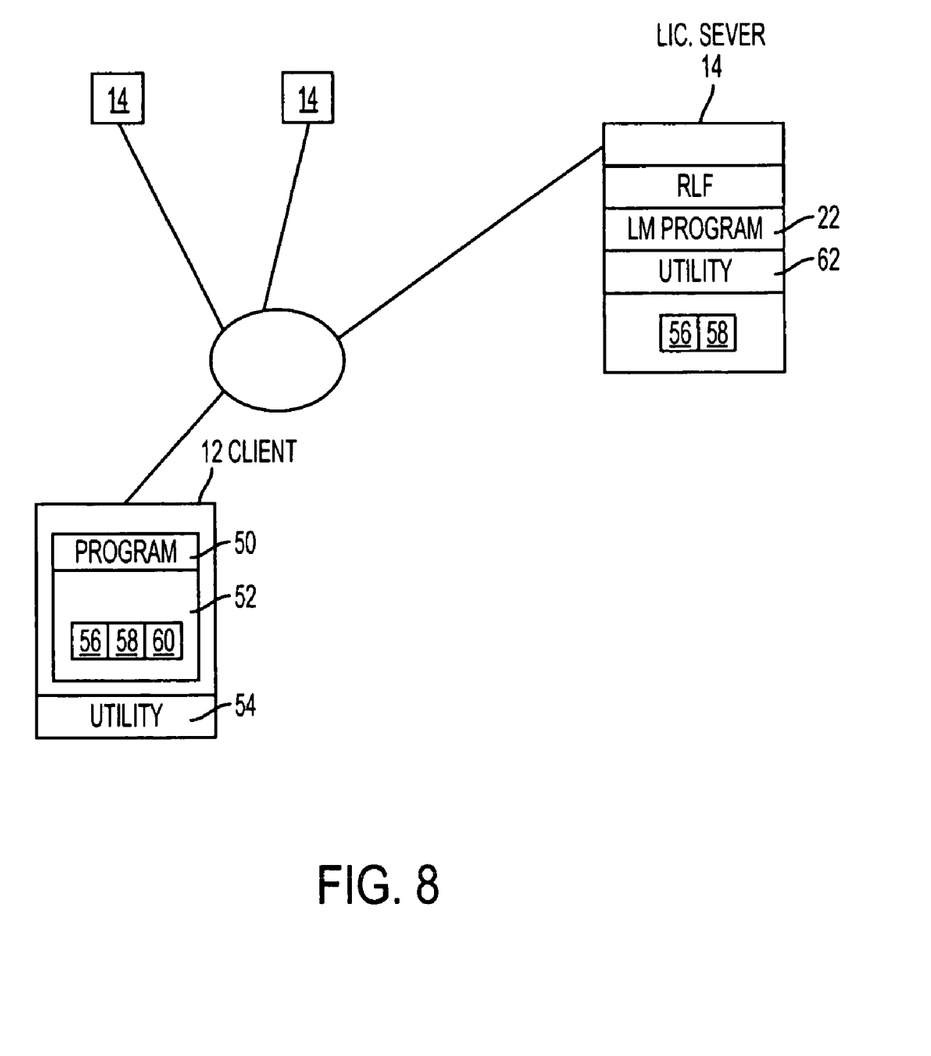
FIG. 8 is a generalized block diagram representation of an example network environment illustrating the storing of commuter authorization information according to an embodiment of the present invention.

When a commuter authorization is sent to the client computer 12, additional commuter authorization information is also encrypted and sent to the client computer 12. As illustrated in FIG. 8, this commuter authorization information includes fingerprint information 60 which uniquely identifies the client computer 12 authorized to receive the commuter authorization, and a commuter authorization lifetime 56, which in preferred embodiments of the present invention is set to 30 days from the granting of the commuter authorization. In alternative embodiments, however, the commuter authorization lifetime 56 can be set by the system administrator to any value less than the remaining time of the license, as limited by the overall expiration date of the license. The commuter authorization information also includes a check-in value 58, which indicates whether the commuter authorization has been returned to the server pool. The commuter authorization lifetime 56 and the check-in value 58 are stored in persistent memory in both the issuing license server 14 and the client computer 12.

Other commuter authorization information may include, but is not limited to, the feature name and version, which identifies the protected software program for which a commuter authorization is granted, and a clock tampering value which, when enabled, allows the client library to detect attempts to tamper with the client computer's clock and invalidate the commuter authorization if tampering is detected. In preferred embodiments of the present invention, the clock tampering value is enabled.

As noted above, in preferred embodiments of the present invention the leader server always has a global picture of the distribution of allocations in the whole server pool. Thus, in the present example any changes to the distribution table of follower server C must be communicated to leader server A. Follower server C will therefore communicate the fact that its available allocations count has dropped to 29 to leader server A, and the distribution table of leader server A will be updated accordingly. Thus, as illustrated in FIG. 7, the distribution table 36 of leader server A reflects that the available allocations record 38 for follower server C has dropped to 29, the allocations in use record 42 for follower server C has increased to 1, and that the record for allocations available for all servers in the pool (see reference character 44) has dropped to 98. Until the commuter authorization is returned or otherwise canceled, the hard limit of available allocations in the server pool is effectively decremented by one.

In addition, in alternative embodiments, the commuter authorization lifetime and the check-in value are communicated from follower server C to the other license servers 14 in the server pool and stored in memory so that even if follower server C should go down, the other license servers 14 in the server pool can take over the management of the issued commuter authorization.

Referring again to FIG. 8, once the commuter authorization is sent by the license server 14, it is received by the client library 52 that initiated the commuter authorization request. Once received, the client computer 12 can be disconnected from the network, because the commuter authorization information received by the client library 52 allows it to independently perform a function similar to a license server 14. Upon receiving a subsequent or present request to run the protected software program 50, the client library 52 decides if it can authorize the client computer 12 to run the requested program 50 by decoding the commuter authorization information and comparing the fingerprint 60, commuter authorization lifetime 56, check-in value 58, and other information to parameters within the client computer 12. If authorization is permitted, then an instantiation of the protected software program 50 is opened. With a commuter authorization, the client library 52 can open the protected software program 50 multiple times, including multiple simultaneous instantiations. It should be noted that once a commuter authorization has been received by the client library 52, all subsequent requests to open the protected software program 50 will be managed by the client library 52 without resorting to a networked license server 14, even though the client computer 12 may still be connected to the network at that time.

The communication, or pinging, that occurs between a client computer 12 that has received a network authorization from a license server 14 is described in a related U.S. utility application entitled "License Management System and Method with Multiple License Servers," Ser. No. 09/648, 697, filed Aug. 25, 2000, the contents of which are incorporated by reference herein. In contrast, pinging is disabled when a client computer 12 receives a commuter authorization from a license server 14. Because neither the client computer 12 nor the license server 14 will respond to the lack of pinging when pinging is disabled, communication between the client computer 12 and the server pool can cease for long periods of time.

At some point in time within the commuter authorization lifetime, the client computer 12 may be re-connected to the network. In preferred embodiments of the present invention, a user may then return the commuter authorization to the network by running a utility 54 that invokes the client library 52 associated with the requested software program 50 and selecting a check-in function. The client library 52 responds by sending a commuter authorization check-in message to the license server 14 that initially granted the commuter authorization. At that time, the check-in value 58 within both the client library 52 and license server 14 is set to indicate that the commuter authorization has been checked in. Thereafter, the commuter authorization is disabled. Furthermore, within the license server 14, the number of available allocations is incremented by one, and this change communicated to the leader server. If the granting license server is down at the time the client library sends the commuter authorization check-in message, this message will be sent to another license server in the pool, and check-in will be managed by that license server. In alternative embodiments, however, rather than checking in the commuter authorization, the commuter authorization is held by the client library 52 for the full term of the commuter authorization lifetime.

It is also possible that the client computer 12 may not be re-connected to the network and may not return the commuter authorization to the issuing license server 14 within the commuter authorization lifetime. As noted above, the commuter authorization lifetime and the check-in value 58 are stored in persistent memory in both the license server 14 and the client computer 12. Thus, if the commuter authorization lifetime ends prior to the return of the commuter authorization, the check-in value 58 within the client library 52 and license server 14 is automatically set to indicate that the commuter authorization has been checked in. Thereafter, the commuter authorization is disabled. Within the license server 14, the number of available allocations is incremented by one, and this change communicated to the leader server. If the granting license server is down and the commuter authorization lifetime ends prior to the return of the commuter authorization, another license server will manage the automatic check-in of the commuter authorization.

Situations may occur where a user operating a client computer 12 remote from the network may need to obtain a commuter authorization. In alternative embodiments of the present invention, this can be accomplished by communicating with the network administrator. A user desiring to obtain a commuter authorization for a particular client computer 12 disconnected from the network first invokes a utility which generates fingerprint information 60 for the client computer 12. This fingerprint information 60 is conveyed to the network administrator through non-networked communications such as by telephone, e-mail, or the like. In addition, other information such as the requested software program is communicated to the network administrator. Other information that may also be conveyed includes the license server 14 from which the commuter authorization will be requested, and the requested time duration of the commuter authorization.

The network administrator then runs a utility 62 on any of the license servers 14 in the server pool that effectively sends a request for a commuter authorization to the targeted license server 14. If, as described earlier, an available allocation is found, the distribution table 36 is updated so that the available allocations record 38 for the targeted license server is decreased by one, and the allocations in use record 42 is increased by one. The commuter authorization lifetime 56 and the check-in value 58 are stored in persistent memory in the license server 14. In so doing, one of the available allocations for a network authorization has been effectively transformed into a commuter authorization. The network administrator is then provided encrypted commuter authorization information as described above.

This encrypted commuter authorization information is conveyed to the user of the remote client computer 12 through non-networked communications such as by telephone, e-mail, or the like. The user then enters this information into the utility, which decodes and provides this information to the client library 52 linked to the requested software program 50. At this point, the commuter authorization has been received, and thereafter both the client computer 12 and the server pool manage the commuter authorization in the usual manner as described above.

Therefore, embodiments of the present invention provide an improved license management system and method for more efficiently managing licenses on a network using a pool of multiple license servers. Embodiments of the present invention provide a system and method for managing licenses on a network that allows a client computer to request and receive a commuter authorization from a license server while connected to the network, which allows the client computer to run a protected software program even if the client computer should become disconnected from the network. In addition, embodiments of the present invention provide a system and method for managing licenses on a network that allows a client computer to request and receive a commuter authorization from a license server while disconnected from the network, allowing the client computer to run a protected software program while disconnected from the network.

What is claimed is:

1. A system for managing licenses for protected software on a communication network, the system comprising:
    at least one client computer capable of being coupled to the communication network for requesting a commuter authorization to use the protected software and for storing a commuter authorization lifetime representing a time period for which the commuter authorization is valid; and
    at least one license server coupled to the communication network, each license server programmed for managing a distribution of allocations to use the protected software and at least one license server programmed for granting a commuter authorization in response to a request for a commuter authorization,
    wherein the at least one client computer is configured with the protected software, the protected software being independent of the at least one license server,
    wherein after a commuter authorization is communicated from a granting license server to a requesting client computer, the requesting client computer may use the protected software while coupled to or decoupled from the communication network until the commuter authorization lifetime expires, the requesting client computer utilizing the commuter authorization independently of the at least one license server, and
    wherein the requesting client computer is further programmed for detecting attempts to tamper with its internal clock and invalidating the commuter authorization if tampering is detected.

2. A system as recited in claim 1, wherein while the requesting client computer maintains a valid commuter authorization, the requesting client computer may open the protected software multiple times, including simultaneous instantiations of the protected software.

3. A system as recited in claim 1, the at least one license server is further programmed for granting a commuter authorization to the requesting client computer and decrementing a count of available allocations only if there is an available allocation in the at least one license server.

4. A system as recited in claim 3, the requesting client computer further including memory for storing commuter authorization information including the commuter authorization lifetime and a check-in value received from the granting license server when the granting license server grants the commuter authorization to the requesting client computer; and the granting license server further including memory for storing commuter authorization information including the commuter authorization lifetime and a check-in value when the granting license server grants the commuter authorization to the requesting client computer.

5. A system as recited in claim 4, the requesting client computer being programmed for returning the commuter authorization by setting its check-in value to a returned state and communicating a check-in message to the granting license server; and the granting license server being further programmed for setting its check-in value to the returned state and incrementing its count of available allocations upon receipt of the check-in message.

6. A system as recited in claim 5, wherein if the commuter authorization is not returned prior to an expiration of the commuter authorization lifetime, at the expiration of the commuter authorization lifetime:

the requesting client computer is further programmed for setting its check-in value to a returned state; and the granting license server is further programmed for setting its check-in value to the returned state and incrementing its count of available allocations.

7. A system as recited in claim 4, the at least one license server comprising a pool of license servers, and wherein the granting license server is further programmed for communicating the commuter authorization lifetime and the check-in value stored in the granting license server to other license servers in the pool when the granting license server grants the commuter authorization to the requesting client computer, so that even if the granting license server should go down, another license server in the pool can act as the granting license server.

8. A system as recited in claim 1, the requesting client computer being programmed for enabling a user to select the commuter authorization lifetime.

9. A system as recited in claim 1, the requesting client computer being programmed for enabling a user to select the license server from which to request a commuter authorization.

10. A method for managing licenses for protected software on a communication network, the method comprising the steps of:

coupling at least one client computer and at least one license server to the communication network;

configuring the at least one client computer with the protected software, the protected software being independent of the at least one license server;

communicating a request for a commuter authorization to use the protected software from the at least one client computer to the at least one license server over the communication network;

granting a commuter authorization to the at least one client computer from the at least one license server and decrementing a count of available allocations within the at least one license server only if there is an available allocation in the at least one license server;

storing a commuter authorization lifetime representing a time period for which the commuter authorization is valid within the at least one client computer, wherein after a commuter authorization is communicated from a granting license server to a requesting client computer, the requesting client computer may use the protected software while coupled to or decoupled from the communication network until the commuter authorization lifetime expires, the requesting client computer utilizing the commuter authorization independently of the at least one license server; and detecting attempts to tamper with an internal clock of the requesting client computer and invalidating the commuter authorization if tampering is detected.

11. A method as recited in claim 10, wherein while the requesting client computer maintains a valid commuter authorization, the requesting client computer is capable of opening the protected software multiple times, including simultaneous instantiations of the protected software.

12. A method as recited in claim 10, the step of granting a commuter authorization to the at least one client computer from the at least one license server further including the steps of:

communicating the commuter authorization lifetime and a check-in value from the granting license server to the requesting client computer; and storing the commuter authorization lifetime and the check-in value in the requesting client computer and the granting license server.

13. A method as recited in claim 12, wherein the protected software is no longer needed, the method further includes the steps of:

returning the commuter authorization by setting the check-in value stored in the requesting client computer to a returned state and communicating a check-in message to the granting license server; and setting the check-in value stored in the granting license server to the returned state and incrementing the count of available allocations stored in the granting license server when the granting license server received the check-in message.

14. A method as recited in claim 12, wherein if the commuter authorization is not returned prior to an expiration of the commuter authorization lifetime, at the expiration of the commuter authorization lifetime the method further includes the steps of:

setting the check-in value stored in the requesting client computer to a returned state; and setting the check-in value stored in the granting license server to the returned state and incrementing the count of available allocations stored in the granting license server.

15. A method as recited in claim 12, the at least once license server comprising a pool of license servers, the method further including the steps of:

communicating the commuter authorization lifetime and the check-in value stored in the granting license server to other license servers in the pool when the granting license server grants the commuter authorization to the requesting client computer, so that even if the granting license server goes down, another license server in the pool acts as the granting license server.

16. A method as recited in claim 10, the step of communicating a request for a commuter authorization to use the protected software further including the step of selecting the commuter authorization lifetime.

17. A method as recited in claim 10, the step of communicating a request for a commuter authorization to use the protected software further including the step of selecting the license server from which to request a commuter authorization.

* * * * *